United States Patent
Morgan et al.

(10) Patent No.: US 11,198,236 B2
(45) Date of Patent: Dec. 14, 2021

(54) MULTI-SHOT INJECTION MOLDED METHOD AND PRODUCT

(71) Applicant: Zephyros, Inc., Romeo, MI (US)

(72) Inventors: Gordon Morgan, Davison, MI (US); Dean Quaderer, Livonia, MI (US); Keith Lewis, Macomb Township, MI (US)

(73) Assignee: ZEPHYROS, INC., Romeo, MI (US)

( * ) Notice: Subject to any disclaimer, the term of this patent is extended or adjusted under 35 U.S.C. 154(b) by 853 days.

(21) Appl. No.: 15/524,680

(22) PCT Filed: Nov. 16, 2015

(86) PCT No.: PCT/US2015/060853
§ 371 (c)(1),
(2) Date: May 5, 2017

(87) PCT Pub. No.: WO2016/077820
PCT Pub. Date: May 19, 2016

(65) Prior Publication Data
US 2018/0297248 A1    Oct. 18, 2018

Related U.S. Application Data

(60) Provisional application No. 62/079,673, filed on Nov. 14, 2014, provisional application No. 62/220,288, filed on Sep. 18, 2015.

(51) Int. Cl.
*B29C 44/00* (2006.01)
*B29C 44/04* (2006.01)
*B29C 44/12* (2006.01)
*B29C 44/18* (2006.01)

(52) U.S. Cl.
CPC ...... *B29C 44/0461* (2013.01); *B29C 44/1271* (2013.01); *B29C 44/188* (2013.01)

(58) Field of Classification Search
CPC ............ B29C 44/0461; B29C 44/1271; B29C 44/188
See application file for complete search history.

(56) References Cited

U.S. PATENT DOCUMENTS

| | | | |
|---|---|---|---|
| 4,460,534 A * | 7/1984 | Boehm | B29C 45/1628 264/246 |
| 5,266,133 A | 7/1993 | Taylor et al. | |
| 5,575,526 A | 11/1996 | Wycech | |
| 5,755,486 A | 5/1998 | Wycech | |
| 5,766,719 A | 6/1998 | Rimkus | |
| 5,932,680 A | 8/1999 | Heider | |
| 6,058,673 A | 5/2000 | Wycech | |
| 6,146,565 A * | 11/2000 | Keller | B62D 29/002 264/252 |
| 6,350,791 B1 | 2/2002 | Feichtmeier et al. | |
| 6,378,933 B1 | 4/2002 | Schoen | |
| 6,413,611 B1 * | 7/2002 | Roberts | B62D 29/002 296/193.06 |
| 6,467,834 B1 | 10/2002 | Barz | |
| 6,474,723 B2 * | 11/2002 | Czaplicki | B62D 25/04 296/187.02 |
| 6,478,367 B2 | 11/2002 | Ishikawa | |
| 6,489,023 B1 | 12/2002 | Shinozaki et al. | |
| 6,720,387 B1 | 4/2004 | Stark et al. | |
| 6,742,258 B2 | 6/2004 | Tarbutton et al. | |
| 6,747,074 B1 | 6/2004 | Buckingham et al. | |
| 6,793,274 B2 | 9/2004 | Riley | |
| 6,820,923 B1 * | 11/2004 | Bock | B60R 13/08 181/286 |
| 6,846,559 B2 | 1/2005 | Czaplicki et al. | |
| 6,883,858 B2 | 4/2005 | Barz | |
| 6,890,021 B2 | 5/2005 | Bock | |
| 6,921,130 B2 * | 7/2005 | Barz | B62D 25/04 296/187.03 |
| 6,941,719 B2 * | 9/2005 | Busseuil | B62D 25/00 296/187.02 |
| 7,077,460 B2 | 7/2006 | Czaplicki | |
| 7,125,461 B2 | 10/2006 | Czaplicki et al. | |
| 7,199,165 B2 | 4/2007 | Kassa et al. | |
| 7,313,865 B2 | 1/2008 | Czaplicki et al. | |
| 7,374,219 B2 | 5/2008 | Brennecke | |
| 7,494,179 B2 * | 2/2009 | Deachin | B60R 13/06 156/78 |

(Continued)

FOREIGN PATENT DOCUMENTS

| | | |
|---|---|---|
| CN | 101812909 A | 8/2010 |
| CN | 101827746 A | 9/2010 |

(Continued)

OTHER PUBLICATIONS

International Search Report for application No. PCT/US2015/060853. dated Feb. 15, 2016.

(Continued)

*Primary Examiner* — Jacob T Minskey
*Assistant Examiner* — Adrien J Bernard
(74) *Attorney, Agent, or Firm* — The Dobrusin Law Firm, P.C.

(57) ABSTRACT

The present invention contemplates a method of forming a member comprising injection molding a first layer into a first tool cavity, overmolding a second layer into a second tool cavity selected from the group consisting of an expandable layer, a sealing layer, an acoustic layer, and adhesive layer, a reinforcement layer, a fastening layer, a second carrier layer, and any combination thereof, overmolding a third layer into the second tool cavity selected from the group consisting of an expandable layer, a sealing layer, an acoustic layer, an adhesive layer, a reinforcement layer, a fastening layer, a second carrier layer, and any combination thereof. The first layer, the second layer, and the third layer may be molded in one injection molding tool and the second and third layer may be segregated from one another prior to any overmolding steps.

20 Claims, No Drawings

(56) References Cited

U.S. PATENT DOCUMENTS

| | | |
|---|---|---|
| 7,503,620 B2 | 3/2009 | Brennecke et al. |
| 7,641,264 B2 | 1/2010 | Niezur |
| 7,748,773 B2 | 7/2010 | Niezur |
| 7,841,647 B2 | 11/2010 | Niezur et al. |
| 7,892,396 B2 | 2/2011 | Sheasley |
| 7,926,867 B2 | 4/2011 | Kochert |
| 8,047,603 B2 | 11/2011 | Goral |
| 8,361,589 B2 | 1/2013 | Kraushaar |
| 8,449,701 B2 * | 5/2013 | Allen ................ B60R 13/08 156/79 |
| 8,469,143 B2 * | 6/2013 | Prunarety ............ B62D 29/002 181/256 |
| 9,096,005 B2 | 8/2015 | Kanie |
| 9,174,370 B2 * | 11/2015 | Komatsu ............... B32B 27/065 |
| 9,782,950 B2 | 10/2017 | Richardson |
| 2001/0042353 A1 | 11/2001 | Honda |
| 2002/0125739 A1 | 9/2002 | Czaplicki |
| 2003/0137162 A1 | 7/2003 | Kropfeld |
| 2004/0016564 A1 | 1/2004 | Lambert |
| 2004/0033324 A1 | 2/2004 | Meyer |
| 2004/0130185 A1 | 7/2004 | Hasler |
| 2004/0204551 A1 | 10/2004 | Czaplicki et al. |
| 2004/0256888 A1 | 12/2004 | Le Gall |
| 2005/0035628 A1 | 2/2005 | Behr |
| 2005/0230027 A1 | 10/2005 | Kassa |
| 2006/0008615 A1 | 1/2006 | Muteau |
| 2006/0181089 A1 | 8/2006 | Andre |
| 2007/0018483 A1 | 1/2007 | Kerscher |
| 2007/0080559 A1 | 4/2007 | Stolarski |
| 2007/0090560 A1 | 4/2007 | Kassa et al. |
| 2007/0090666 A1 | 4/2007 | Brennecke |
| 2007/0096508 A1 | 5/2007 | Rocheblave |
| 2007/0101679 A1 | 5/2007 | Harthcock et al. |
| 2008/0029200 A1 | 2/2008 | Sheasley |
| 2008/0060742 A1 | 3/2008 | Sheasley et al. |
| 2008/0308212 A1 | 12/2008 | Sheasley et al. |
| 2009/0085379 A1 | 4/2009 | Takahasi |
| 2009/0269547 A1 | 10/2009 | Meyer et al. |
| 2010/0021267 A1 | 1/2010 | Nitsche |
| 2010/0117397 A1 | 5/2010 | Richardson |
| 2011/0104413 A1 | 5/2011 | Mendiboume |
| 2011/0206890 A1 | 8/2011 | Belpaire |
| 2013/0133771 A1 | 5/2013 | Richardson |
| 2014/0091584 A1 | 4/2014 | McConnell |
| 2015/0165737 A1 | 6/2015 | Richardson |
| 2016/0273160 A1 | 9/2016 | Braymand |
| 2017/0072887 A1 | 3/2017 | Richardson |
| 2018/0029328 A1 | 2/2018 | Richardson |
| 2018/0037703 A1 | 2/2018 | Richardson |

FOREIGN PATENT DOCUMENTS

| | | |
|---|---|---|
| CN | 102858510 A | 1/2013 |
| EP | 2559541 A1 | 2/2013 |
| JP | 2001179903 A | 7/2001 |
| WO | 02/086003 A1 | 10/2002 |
| WO | 03/072677 A1 | 9/2003 |
| WO | 03/011954 A1 | 12/2003 |
| WO | 03/103921 A1 | 12/2003 |
| WO | 2004/037509 A1 | 5/2004 |

OTHER PUBLICATIONS

Chinese First Office Action dated Nov. 23, 2018, Application No. 201580062003.0.

* cited by examiner

MULTI-SHOT INJECTION MOLDED METHOD AND PRODUCT

FIELD OF THE INVENTION

The present disclosure relates generally to a vehicle baffle assembly formed by a multi-shot injection molding process. More specifically, the present disclosure relates to multi-layer baffle formed using a two or three-shot injection molding process in the same injection molding tool.

BACKGROUND

To reduce fuel consumption in vehicles, the automotive industry has been focused on using lighter weight materials, such as aluminum, and hollow vehicle frames. These lighter weight materials often lack sufficient strength for a vehicle's structural integrity and crash durability. The hollow frames may also result in decreased strength and increased noise and vibrations in vehicles. The automotive industry has used inserts, such as baffles, to increase vehicle frame strength, stiffness, and provide a means for reducing noise, vibration, and harshness (NVH) in vehicles while still maintaining the light weight properties of the vehicle frame. Some of these baffles may be multi-layered baffles.

Multi-shot injection molding processes provide a manufacturing means for simplified customization of vehicle parts without requiring additional manufacturing steps or tools. In forming multi-layered parts, injection molding allows for the formation of two or more layers of distinct materials within one injection molding tool, as opposed to requiring a step of forming the separate layers in distinct tools and including an attaching means and an attaching step.

Two-shot injection molding processes to form a carrier having an expandable material thereon are disclosed in U.S. Pat. Nos. 7,841,647; 7,494,179; and 7,503,620. However, a three-shot or four-shot process to form a second carrier layer, an acoustical layer, an attachment feature, other distinct layer, or some combination thereof is not disclosed. Additionally, a single-shot process combining insert injection molding or a two-shot process combining with simultaneous injection molding of two or more layers are not disclosed.

It is thus desirable to form a multi-layered baffle structure which is useful in providing reduction for noise, vibration, and harshness (NVH), an increase in vehicle structure stiffness, an increase of vehicle structure crash durability, or a combination thereof. It is desirable to form a multi-layered baffle structure that provides a carrier layer, a sealing layer, an additional layer that may provide for a second carrier layer, a second sealing layer, a fastening layer, an acoustic layer, an expanding layer, a reinforcing layer, a protective layer, or an encapsulating layer. One or more layers may comprise an expandable (e.g., activatable) material.

SUMMARY

The present teachings overcome one or more of the above needs by providing a multi-layer baffle structure having a first carrier layer and second and third layers selected from an expandable layer, a sealing layer, an acoustic layer, an adhesive layer, a reinforcement layer, a fastening layer, a second carrier layer, a protective layer, an encapsulating layer, and any combination thereof. The baffle structure may be formed by a single-shot, two-shot, three-shot, or even four-shot injection molding process. The injection molding process may take place in only one molding tool. The injection molding process may comprise insert injection molding. The molding process may be proceeded by, or may be followed by, a secondary manufacturing process such as extrusion or pultrusion.

The present teachings provide for a device, such as a multi-layer baffle, comprising: (a) a carrier having a predetermined shape, including at least one portion with a longitudinal axis and having an outer surface with a first end and a second end; (b) a first expandable material capable of being activated to expand under a first activation condition, come into contact with, and adhere to a wall defining a cavity in order to at least partially fill the cavity; wherein the first expandable material is capable of expanding from about 25% to about 400% as compared to its green state; (c) an injection molded second expandable material capable of being activated to expand under a second activation condition, to come into contact with, and adhere to a wall defining the cavity in order to at least partially fill the cavity, the second expandable material being in intimate contact, the second expandable material being capable of expanding from about 200% to about 5000% as compared to its green state; wherein the first expandable material, the second expandable material, or a combination thereof, alone, or in combination with the carrier expands to form a complete seal of the cavity following activation.

The first expandable material may be a structural layer. The second expandable material may be an acoustic material. The second expandable material may be a sealant. The device may be free of any separate fasteners or adhesives for attaching the first expandable material or the second expandable material to the carrier or to each other. The first expandable material may be injection molded. The carrier may comprise a metallic material, polybutylene terephthalate (PBT), nylon, or a combination thereof. The carrier, the first expandable material, and/or the second expandable material may include an integrally formed post. The carrier, the first expandable material, and/or the second expandable material may have a parting line and/or a gate vestige. The first expandable material, the second expandable material, or both may be each a single continuous piece. The device may be adapted for use in a cavity that is completely or partially enclosed about a periphery. The carrier may be insert molded. The device may comprise a fourth material. The carrier may be comprised of a first carrier layer and a second carrier layer. The second carrier layer may be the fourth material. The fourth material may be insert molded. The fourth material may be a fiber reinforcement. The second expandable material may be on the first end, the second end, or both the first end and second end of the carrier. The first expandable material and the second expandable material may not be in contact with one another. The carrier may include an expansion directing feature. The expansion directing feature may prevent the second expandable material from interfering with the contact surface of the first expandable material.

The present teachings further provide for a method of forming a device comprising (a) providing the carrier in a mold; (b) injection molding the first expandable material in the mold; and (c) injection molding the second expandable material in the mold.

The present teachings further provide for a method of forming a member comprising injection molding a first carrier layer, injection molding a second layer selected from the group consisting of an expandable layer, a sealing layer, an acoustic layer, an adhesive layer, a reinforcement layer, a fastening layer, a second carrier layer, and any combination thereof and injection molding a third layer selected from the group consisting of an expandable layer, a sealing layer, an acoustic layer, an adhesive layer, a reinforcement layer, a fastening layer, a second carrier layer, and any combination thereof. The first carrier layer, the second layer, and the third layer are molded in one injection molding tool. The method may include an extrusion or pultrusion step.

DETAILED DESCRIPTION

The present teachings include a multi-layer baffle structure having a first layer which may be a carrier layer, a second and third layer selected from an expandable layer, a sealing layer, an acoustic layer, an adhesive layer, a reinforcement layer, a fastening layer, a second carrier layer, a protective layer, an encapsulating layer, and any combination thereof. The structure may include a fourth layer that is molded with the first layer to provide a carrier comprising more than one grade of carrier material. Any of the layers may overmold a fastening device and/or reinforcing member. The fastening device and/or reinforcing member may comprise one or more of a metallic material, a polymeric material, a fibrous material (which may be a non-woven or woven material), or any combination thereof. The present disclosure provides for a multi-layer baffle structure which may be adapted for use in a cavity. The multi-layer baffle structure may be completely or partially enclosed about a periphery, such as when disposed within the cavity. Any one of the layers may include a means for attaching the member to a cavity, such as a vehicle cavity.

This application claims the benefit of the filing dates of U.S. Provisional Application Nos. 62/079,673, filed Nov. 14, 2014, and 62/220,288, Filed Sep. 18, 2015, the contents of these applications being hereby incorporated by reference herein for all purposes.

The first layer may include a polymeric material. Exemplary materials include thermoplastics, rubbers, elastomers, and thermosets, including polyester, polypropylene, polyamide, molding compounds (e.g., sheet or bulk molding compound), polyethylene, polyvinylchloride, polybutylene terephthalate (PBT), combinations thereof or the like. The first layer may comprise a nylon material. The first layer may comprise a metallic material. The fourth layer may also comprise a polymeric material, including any of those listed above, a nylon material, and/or a metallic material. The first layer and fourth layer may be combined to form a carrier. The first layer may be less ductile and/or more rigid than the fourth layer. The ductility of the fourth layer may be such that it is easily adapted to accept means for attaching the member to a vehicle cavity. The first layer may be a first carrier material. The fourth layer may be a second carrier material.

Any expandable layer may include an epoxy-based foam, which may behave as a thermoset material or a thermoplastic material upon activation. Exemplary materials include a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. The expandable layer may be a room-temperature cure material that may activate due to a chemical or physical stimulus. From a chemical standpoint for a thermally-activated material, the structural foam is usually initially processed as a flowable thermoplastic material before curing. It may cross-link upon curing, which makes the material incapable of further flow. The expandable layer may have an activation temperature or melting temperature greater than the activation temperature or melting temperature of the first layer. If one or more expandable layers are present, the one or more expandable layers may have the same activation temperature or differing activation temperatures. Examples of suitable expandable layers can be found in U.S. Pat. Nos. 7,892,396 and 7,313,865; 7,125,461; and 7,199,165 and U.S. Published Application Nos. 2004/0204551; 2007/0090560; 2007/0101679; 2008/0060742; and 2009/0269547, each incorporated by reference herein for all purposes. Additional suitable materials may be sold as L-5520 and L-2821, available from L&L Products, Inc. in Romeo, Mich. Suitable expandable layers may also be considered suitable structural layers, sealing layers, acoustic layers, adhesive layers, reinforcement layers, fastening layers, second carrier layers, protective layers, or encapsulating layers. As an example, a layer may provide a sealing capability, but may also be an expandable material that provides acoustic control. The expandable layer may cover or protect epoxy-based materials. For example, the expandable layer may protect one or more epoxy-based materials from moisture. The expandable layer may encapsulate the epoxy-based materials. Suitable sealing layers may include epoxy-based materials. Epoxy resin may be used herein to mean any of the conventional dimeric, oligomeric or polymeric epoxy materials containing at least one epoxy functional group. Such materials may be epoxy containing materials having one or more oxirane rings polymerizable by a ring opening reaction. In preferred embodiments, the sealant material includes up to about 80% of an epoxy resin. More preferably, the sealant includes between about 10% and 50% by weight of epoxy containing materials. Suitable sealant materials are disclosed in U.S. Pat. Nos. 6,350,791; 6,489,023; 6,720,387; 6,742,258; and 6,747,074; US Published Application Nos. 2004/0033324; and 2004/0016564; and WIPO Publication Nos. WO 02/086003; WO 03/103921; WO 03/072677; WO 03/011954; and WO 2004/037509, all of which are incorporated by reference herein for all purposes. As discussed above with reference to any expandable layers, suitable sealing layers may also be considered suitable expandable layers, acoustic layers, adhesive layers, reinforcement layers, fastening layers, or second carrier layers.

Any acoustic layers may include a polymer-based acoustic foam, and more particularly an ethylene based polymer. Any acoustic layer may include fibers arranged as a woven or non-woven material, which may be lofted and/or compressed and molded to a desired shape. A foamable material may be based on an ethylene copolymer or terpolymer that may contain a C 3 to C 8 alpha-olefin co-monomer. Examples of particularly preferred polymers include ethylene vinyl acetate copolymers, ethylene acrylate copolymers, EPDM, or mixtures thereof. Other examples of preferred foam formulations that are commercially available include polymer-based materials commercially available from L&L Products, Inc. of Romeo, Mich., under the designations as L-2105, L-2100, L-7005 or L-2018. Additional suitable materials are described in U.S. Pat. Nos. 5,266,133; 5,766,719; 5,755,486; 5,575,526; and 5,932,680, each incorporated by reference herein for all purposes. As discussed above with reference to any expandable layers, suitable acoustic layers may also be considered suitable expandable layers, sealing layers, adhesive layers, reinforcement layers, fastening layers, or second carrier layers.

Any adhesive or reinforcement layer may include an epoxy based adhesive. Suitable adhesives may include one or more of an epoxy component, an epoxy/elastomer adduct, a curing agent, an accelerating agent, a phenoxy resin, a core/shell polymer, additional polymers/copolymers, blowing agents, and fillers. Examples of suitable adhesives are described in U.S. Pat. Nos. 6,846,559; and 7,892,396 and U.S. Patent Publication Nos. 2008/0060742; and 2008/0308212, the contents of these being hereby incorporated by reference for all purposes. Suitable adhesives may be dry to the touch or may be tacky. Such adhesives may be powder adhesives which be sprayed onto a surface or electrostatically deposited onto a surface. As discussed above with reference to any expandable layers, suitable adhesive and reinforcement layers may also be considered suitable expandable layers, acoustic layers, sealing layers, fastening layers, or second carrier layers.

Suitable fastening layers may be formed to include an integrated fastener located thereon. The fastening layer may include an adhesive component. The integrated fastener may be flexible or rigid. The integrated fastener may be formed of any of the materials disclosed above as carrier layers, adhesive layers, reinforcement layers, acoustic layers, expandable layers or sealing layers. The integrated fastener may be a mechanical fastener, such as a screw fastener, a tree-fastener, a push-pin fastener, or the like. The fastener may also be provided in a variety of shapes and in a variety of configurations so long as it can secure the sealing device to a cavity, such as a post or tab. One example of a suitable fastener is disclosed in U.S. Publication No. 2010/0021267 incorporated by reference herein for all purposes. The fastener may be capable of securing multiple layers or types of materials to a structure. Examples of suitable fasteners include mechanical fasteners, clips, tabs, press-fits, snap-fits, screws, hooks, combinations thereof or the like. Furthermore, it is contemplated that the one or more fasteners may be formed integral of a singular material with the material of one or more layers.

The carrier may have any suitable shape for providing a cavity with reinforcement, sealing, acoustic dampening, or the like. The carrier may have a predetermined shape prior to installation in the cavity. The carrier may have at least one portion with a longitudinal axis. The carrier includes an outer surface. The carrier may include a first end and a second end. The carrier may be injection molded, such as through insert molding. The carrier may be comprised of one or more layers. As an example, the carrier may be comprised of the first layer and the fourth layer. The first layer may be the first carrier material. The fourth layer may be the second carrier material. The carrier may include one or more directing features which may guide one or more layers during activation. The one or more directing features may include one or more expansion directing features, which may guide one or more expandable layers from a green state to their expanded state. The one or more expansion directing features may prevent one expandable layer interfering with a contact surface of another expandable layer. The carrier may include a shut-off surface over at least a portion of the carrier, preferably the shut-off surface is perpendicular to the longitudinal axis. The carrier may have one or more surfaces adapted to receive pressure from a steel mold. The carrier may include one or more ribs for providing additional stiffness or rigidity. The carrier may include one or more ribs to provide for a shut-off surface. The one or more ribs may be about 0.1 mm wide to about 5 mm wide, preferably about 0.5 to about 3 mm wide, more preferably about 1 mm to about 2 mm wide. The one or more ribs may comprise an upper surface. The upper surface may be substantially co-planar with an adhesive. The one or more ribs may provide for compression of the carrier during the molding process, such as if the carrier is made of nylon. For example, the nylon may be compressed such that sealant material does not leak from the multi-layer baffle during the molding process.

The second layer may comprise an expandable layer. The second layer may provide structural reinforcement to a cavity, structural support to the carrier, or both. The second layer may be located about the carrier, disposed within the carrier, or both. The second layer may be concentrated toward the center of the carrier. The second layer may not be disposed on the first end, the second end, or both ends of the carrier. The second layer may comprise a first expandable material. The second layer may be activated to expand under a first activation condition. The second layer may have a green state and an expanded state. The second layer may expand from the green state to the expanded state under a first activation condition. The second layer may be capable of expanding from about 25% to about 400% to its expanded state from its green state. The second layer may have a contact surface. In the expanded state, the second layer may have the capability to come into contact, at least partially, by the contact surface, with a wall of a cavity. In the expanded state, the second layer may have the capability to adhere, at least partially, with a wall of the cavity. The second layer, in the expanded state, may at least partially fill a cavity. The second layer may be structural. The second layer may be injection molded. The second layer may be attached to the carrier, to the third layer, or both. The second layer may be free from any separate fasteners or adhesives for attaching the second layer to the carrier, the third layer, or both. The second layer may be free of contact from the third layer in the green state. The second layer may come into contact with the third layer after expansion.

The third layer may comprise an activatable layer, which may be an expandable layer. The third layer may be located about the carrier, disposed within the carrier, or both. The third layer may be disposed at the first end, the second end, or both of the carrier. The third layer may be disposed along the center or middle of the carrier. The third layer may be an acoustic layer, a sealing layer, or both. The third layer may provide acoustic dampening, sealing, or both to a cavity. The third layer may include a fibrous portion. The third layer may comprise a second expandable material. The third layer may be activated to expand or adhere under a second activation condition. The second activation condition may be the same condition as the first activation condition or may differ. The third layer may have a green state and an activated state. The third layer may expand from the green state to the activated state under the second activation condition. The third layer may be capable for expanding from about 200% to about 5,000% to its expanded state from its green state. In the expanded state, the third layer may have the capability to come into contact, at least partially, by a contact surface, with a wall of the cavity. The third layer may come into intimate contact with the wall of the cavity. In the expanded state, the third layer may have the capability to adhere, at least partially, with a wall of the cavity. The third layer, in the expanded state, may at least partially fill the cavity. The third layer may be injection molded. The third layer, the first layer, or a combination thereof, alone, or in combination with the carrier may expand to form a complete seal of the cavity following activation. The third layer may be attached to the carrier, to the second layer, or both. The third layer may be attached or located at the first end, the second end, or both of the carrier. The third layer may be free from any separate fasteners or adhesives for attaching the third layer to the carrier, the second layer, or both. The third layer may be prevented from interfering with a contact surface of the second layer, such as by a directing feature, such as an expansion directing feature, of the carrier. The third layer may be free of contact from the second layer in its green state. The third layer may come into contact with the second layer after expansion.

The fourth layer may provide a reinforcement layer. The fourth layer may be part of the carrier. The fourth layer may be the second carrier material. The reinforcement member may comprise a fibrous material, which may be a fibrous mat material. The ductility of the fourth layer may be higher than the ductility of the first layer. The fourth layer may be metallic, polymeric, fibrous, or any combination thereof. The fourth layer may be an activatable material. The fourth layer may be overmolded by one of the other materials.

The disclosure further relates to a method of forming a multi-layer baffle which may be formed by a single shot or a multi-shot injection molding process. The multi-shot process may be a two-shot injection molding process, a three-shot injection molding process, or even a four-shot. The injection molding process may take place in one injection molding tool thereby eliminating the need for additional processing or manufacturing steps. The process may take place in one injection molding tool comprising at least two tool cavities. The method may include injection molding into a first tool cavity the first layer, fourth layer, or both, prior to overmolding the second and/or third layer. The first layer and fourth layer may be injection molded substantially simultaneously using valve gates to control the location of the first layer and fourth layer in the first tool cavity. The injection molding process may comprise: providing the carrier in a mold, injection molding the first expandable material in the mold, and injection molding the second expandable material in the mold. The first expandable material and the second expandable material may be simultaneously injection molded. The second layer and the third layer may be simultaneously injection molded. For example, the first expandable material and the second expandable material are simultaneously injection molded. Simultaneously molding the first expandable material and the second expandable material may provide for a two-shot injection molding process. The method may include insert injection molding the first layer, the fourth layer, or both. The injection molding process may allow for one or more layers to be formed as a single continuous piece. Preferably, the second layer, the third layer, or both are each formed as a single continuous piece. The injection molding process may include insert injection molding one or more of the layers. For example, the first layer, the fourth layer, or both may be insert injection molded. Insert injection molding one or more layers may provide for a single shot injection molding process. The injection molding process may result in a parting line or a gate vestige in the first layer, the second layer, the third layer, the fourth layer, or a combination thereof. The method may include an extrusion or pultrusion step, either of which may be in-line with any injection molding step. Any one of the materials described herein may be formed onto any device described herein by and extrusion or pultrusion process.

The method may further include locating the member into a cavity, such as a vehicle cavity. The method may include activating one or more layers to expand and adhere. For example, the method may include activating the second layer, third layer, or both such that the multi-layer baffle adheres to a cavity. Such activation may occur upon exposure to heat. Alternatively, activation may occur at room temperature as a result of a chemical or physical interaction between one or more materials described herein.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "'x' in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A reinforcing structure comprising:
    (a) an integrally molded carrier having a predetermined shape prior to installation and adapted to fit in a cavity of a vehicle, including a first surface and a second surface;
    (b) an injection molded first expandable material capable of being activated to expand under a first activation condition, come into contact with, and adhere to a wall defining the cavity in order to at least partially fill the cavity; wherein the first expandable material is located onto the first surface and is capable of expanding from about 25% to about 400% as compared to its green state and wherein the first expandable material is a structural layer;
    (c) an injection molded second expandable material capable of being activated to expand under a second activation condition, to come into contact with, and adhere to a wall defining the cavity in order to at least partially fill the cavity, the second expandable material being located onto the second surface, the second expandable material being capable of expanding from about 200% to about 5000% as compared to its green state and wherein the second expandable material is a sealant material;
    wherein the first expandable material, the second expandable material, or a combination thereof, alone, or in combination with the carrier expands to form a complete seal of the cavity following activation and wherein the first expandable material and second expandable material are substantially free of any direct contact with one another when both materials are in their green state.

2. The reinforcing structure of claim 1, wherein the carrier provides reinforcement following activation.

3. The reinforcing structure of claim 1, wherein the second expandable material is an acoustic sealing material.

4. The reinforcing structure of claim 2, wherein the reinforcing structure is free of any separate fasteners or adhesives for attaching the first expandable material or the second expandable material to the carrier or to each other.

5. The reinforcing structure of claim 1, wherein the carrier comprises a metallic material, polybutylene terephthalate (PBT), Nylon, or a combination thereof.

6. The reinforcing structure of claim 1, wherein the carrier, the first expandable material, and/or the second expandable material include an integrally formed post.

7. The reinforcing structure of claim 1, wherein the carrier, the first expandable material, and/or the second expandable material have a parting line and/or a gate vestige.

8. The reinforcing structure of claim 1, wherein the first expandable material, the second expandable material, or both are each a single continuous piece.

9. The reinforcing structure of claim 8, wherein the structure is adapted for use in the cavity that is completely or partially enclosed about a periphery.

10. The reinforcing structure of claim 1, wherein the carrier is insert molded.

11. The reinforcing structure of claim 1, wherein the carrier is comprised of a first carrier layer and a second carrier layer.

12. The reinforcing structure of claim 11, wherein the second carrier layer is insert molded.

13. The reinforcing structure of claim 11, wherein the second carrier layer is a fiber reinforcement.

14. The reinforcing structure of claim 1, wherein the second expandable material is on a first end, a second end, or both the first end and the second end of the carrier.

15. The reinforcing structure of claim 1, wherein the first expandable material and the second expandable material contact each other during expansion.

16. The reinforcing structure of claim 1, wherein the carrier includes an expansion directing feature.

17. The reinforcing structure of claim 16, wherein the expansion directing feature prevents the second expandable material from interfering with the contact surface of the first expandable material.

18. A method for making the reinforcement structure of claim 1 comprising:
    (a) providing the carrier in a mold;
    (b) injection molding the first expandable material in the mold; and
    (c) injection molding the second expandable material in the mold.

19. The reinforcing structure of claim 1, wherein the first expandable material and the second expandable material, in combination with the carrier, expand to form a complete seal of the cavity following activation.

20. The reinforcing structure of claim 1, wherein the second activation condition differs from the first activation condition.

* * * * *